United States Patent Office 3,054,674
Patented Sept. 18, 1962

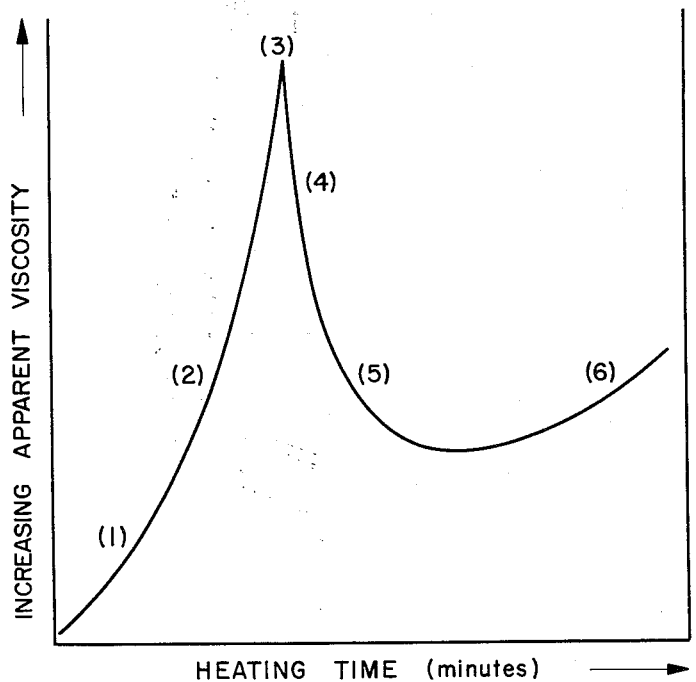
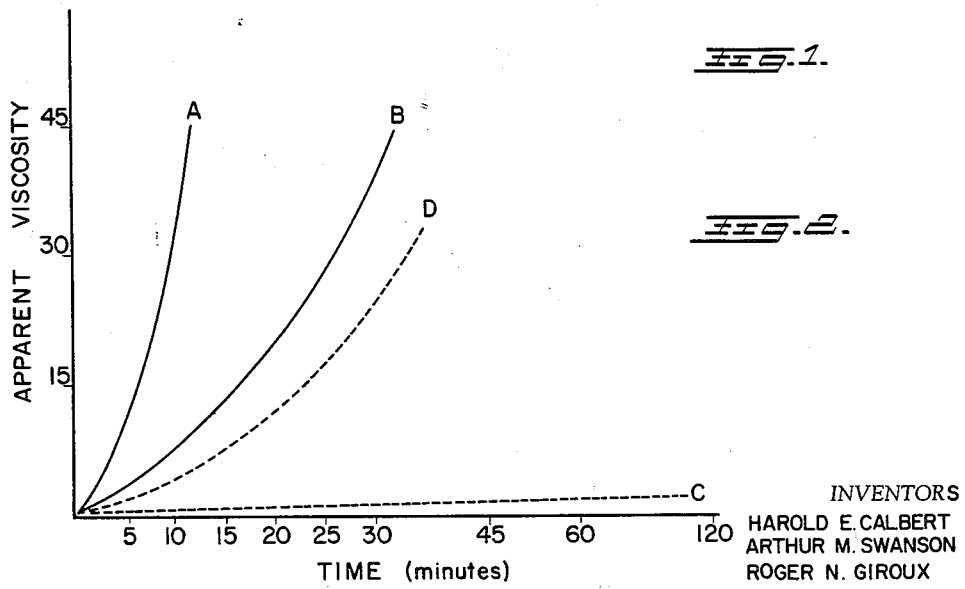

3,054,674
METHOD OF PREPARING CONCENTRATED MILK AND RESULTING PRODUCT
Harold E. Calbert and Arthur M. Swanson, Madison, Wis., and Roger N. Giroux, St.-Hyacinthe, Quebec, Canada
Filed Dec. 11, 1959, Ser. No. 858,919
The entire term of the patent to be granted is hereby dedicated to the public
9 Claims. (Cl. 99—55)

The present invention relates to a novel method for the production of improved stable concentrated whole milk products and the resulting products.

The problem of getting a fluid whole milk product from areas of low cost, efficient milk production to areas where milk production is less efficient and at a much higher cost has been recognized for many years. With whole milk they include the relatively short keeping time, the high cost of required refrigeration, the high cost of transportation of a bulky product containing relatively large amounts of water, the difficulties encountered, due to local regulations, of introducing a pasteurized but unsterilized product into certain cities and towns, etc. These problems can be largely avoided by the use of canned sterilized concentrated milk but this solution of the problem has been found to present another, yet similarly serious, set of problems. The keeping qualities and acceptability of concentrated sterilized milks available heretofore, for example, are known to be limited by color changes and off-flavor development and by the occurrence of fat separation and gelation. Canned evaporated milk which is standardized to 7.9 percent fat and 25.9 percent total solids and sterilized in the cans by heating through a 20-minute period up to 242–245° F. and holding at this temperature for 15 minutes, and which is characterized by its yellowish color and an off-taste of the "cooked" variety, is illustrative. High temperature short time processing treatments have been found to minimize these color and flavor changes but to increase the problems of fat separation and gelation. A milk concentrate in which the fat separates or which gels in the can and takes on a custard-like appearance is obviously not acceptable to the housewife. As a result, it has been necessary up to the present time to convert most of the milk into butter, cheese and like relatively stable, low moisture products.

The principal object of the present invention is to provide new and improved fluid concentrated whole milk products and a method of preparing the same.

More specific objects of the present invention are to provide stable concentrated whole milk products free from fat separation and gelation.

Additional specific objects of the present invention are to provide concentrated whole milk products of natural color and taste and which, when diluted with water to their original volume, have the color and taste of fresh pasteurized whole milk.

Other objects of the present invention will be apparent as the description hereinafter proceeds.

In our research investigations in attempts to solve the problems noted above, it occurred to us that if gelation could be brought about under controlled conditions in a milk concentrate and the gel produced then destroyed by proper processing treatments and the proper viscosity and solubility index maintained, subsequent gelation along with fat separation might possibly be avoided. With continued investigation this approach was developed and discovered to work.

FIGURE I is an illustrative graph showing changes in apparent viscosity with time for a concentrated milk held at elevated temperatures. FIGURE II is a similar type graph showing increases in apparent viscosity with time for four milk concentrates.

The method of the present invention comprises essentially the preparation of a whole milk concentrate and the holding of the concentrate at an elevated temperature of about 185–210° F. for a sufficient time until the apparent viscosity of the concentrate, which increases during this period, passes through its maximum, and substantially immediately thereafter breaking up the resulting gel before the concentrate undergoes a physical-chemical change which is evident by the one-set of decreasing solubility, and flocculation or graininess. The development of viscosity and gelation during this holding period is illustrated by the curve in FIGURE I. Increasing viscosity in the concentrated milk is shown by points 1 and 2 on the curve. As the viscosity increases toward the maximum point 3 gelation occurs. During this period, i.e. up to maximum point 3, gelation is reversible in that with a reduction in viscosity, e.g. by breaking up the gel, gelation will again occur. Gelation, however, will not again occur if the gel is destroyed after the viscosity passes through its maximum and starts to decrease as shown at point 4. During this phase, i.e. up to point 4, solubility as demonstrated by solubility index measurements has not been altered. Beyond point 4, e.g. at point 5 where the curve begins to flatten, solubility is altered, i.e. decreases, and the concentrated milk undergoes, as indicated above, an unwanted physical-chemical change which is also evidenced by the on-set of flocculation or graininess. At point 6, there is a slight increase in viscosity with the on-set of discoloration and flavor change. The rate of increase in viscosity and on-set of gelation illustrated by the curve of FIGURE I is dependent upon the time-temperature relationship including the time and temperature of previous heat treatments, the concentration of milk solids in the milk, the salt balance, etc. The optimum holding time (illustrated by point 4 in FIGURE I) at a particular temperature for a particular batch of milk, however, can be readily ascertained by the following control procedure. A series of fourteen tin cans are filled with concentrated milk. The cans are then sealed and heated without shaking to 185–210° F. in a water bath. The heating is extended over a two-hour period. Cans of the concentrated milk are removed from the water bath at 0, 1, 3, 5, 10, 15, 20, 25, 30, 35, 45, 60, 90 and 120 minutes and are immediately cooled to room temperature in a water bath. The viscosity is then measured directly in the cans, e.g. by means of a modified Gardiner mobilometer plunger. From this data a viscosity-time curve of the type illustrated in FIGURE I can be plotted and the time when the viscosity passes through its maximum and reaches point 4 can be readily ascertained. The slope of the curve has a direct relationship to "gelling time" and is also used as a means of determining the processing treatment required. This is illustrated by lines A and B in FIGURE II. If, for example, there is a rapid increase in viscosity (as shown by line A) the necessary holding time will be quite short. With a product with a relatively slow increase in viscosity (as shown by line B) a much longer holding time will be required.

These tests also may be used as an indication of keeping quality of the finished sterile product. An increase in viscosity upon heating as shown by curve D in FIGURE II is indicative of a limited storage life as gelation will occur. However, a viscosity curve similar to curve C in FIGURE II is indicative of a long storage life. If the milk gels on standing it is obvious that the heat treatment was not continued for a sufficient length of time and if the solubility of the milk has been altered and it tends to flocculate or be grainy in character, it is obvious that the heat treatment was continued for too long a time. Optimum processing conditions may vary with different milks but can be readily ascertained by preliminary tests as noted above.

The following examples will serve to illustrate the invention.

General Example 1

Raw whole milk, preferably of high quality and which can be standardized to the ratio of fat to solids-not-fat desired in accordance with standard practices in the art, is first subjected to an initial preheat treatment of from about 145° F. to about 205° F. for about 30 minutes. The optimum conditions for use in this forewarming step are dependent upon seasonal variations in the milk, milk composition, etc., and can be determined by the control procedure described above. The hot milk is next subjected to a final preheat treatment of about 275-300° F. for 3 seconds or less in a high temperature heat exchanger. The purpose of this heat treatment is to sterilize and condition the milk. The milk is next concentrated under vacuum to the desired concentration in an evaporator under sterile conditions.

The resulting milk concentrate (which should be cooled to below 40° F. if it is to be held for any length of time and which can be again standardized to the desired final fat and total solids content as well as to be fortified at this time with added vitamins) is next subjected to an initial post heat treatment of about 170-185° F. with no holding time. This heat treatment is followed with a second post heat treatment of about 275-300° F. for 3 seconds or less. The purpose of these heat treatments is to insure a sterile product and to condition the milk for "gelling." The milk concentrate is then cooled to about 190-210° F. and held under sterile conditions up to about 30 minutes. During this period the viscosity increases, the concentrate forms a gel and the viscosity passes through its maximum point. At this point (point 4 in FIGURE I determined by the control procedure described above) the gel is destroyed by physical means as, for example, by use of a homogenizer, colloidal mill, Waring Blendor, pumps, ultrasonic waves, etc. The concentrate is then finally cooled to about room temperature and canned or packaged under asceptic conditions. The resulting canned product requires no refrigeration, although the shelf-life and palatability may be considerably extended by keeping under refrigeration without freezing of the product, is stable, i.e. free from fat separation and gelation, and can be diluted with water to bring the volume up to the original volume of the whole milk to form a milk product having the color and taste of fresh pasteurized whole milk.

Specific Example 1

Raw whole milk of high quality, standardized to a fat to solids-not-fat ratio of 1:2.43, is first subjected to an initial preheat treatment of about 180° F. for about 30 minutes. The hot milk is next subjected to a final preheat treatment of about 285° F. for about 3 seconds. The resulting sterilized milk is concentrated under vacuum in an evaporator under sterile conditions to about one-third its original volume. Preferably, with a double effect evaporator, the first effect should not operate over 150° F. and the second effect not over 120° F., and with a single effect evaporator, it should not operate over 125° F. In either case, the evaporator preferably also should be of the rapid circulating type with a minimum amount of product in the equipment at any one time. At this time the product can be standardized to final concentration of 10.5% fat and 36.0% total solids and vitamin "D" added and/or a possible stabilizer, e.g. locust bean gum, Irish moss, sodium alginate, etc.

At this point a series of twelve 211 x 414 cans are filled with the concentrated milk and the cans are sealed and heated without shaking in a water bath at 195° F. Cans are removed at the intervals such as noted above for the control procedure, cooled to room temperature and the viscosity measured. The viscosity is then plotted as in FIGURE I to determine the optimum time (point 4 on the curve) for breaking up the gel. With this batch of milk it was found to be 20 minutes. The concentrated milk (which has been cooled and held at about 32° F. during the time required for the control operation described above) is next subjected to an initial post heat treatment of about 175° F. with no holding time. This heat treatment is followed with a second post heat treatment of about 285° F. for about 3 seconds. The sterile concentrate is then cooled to about 195° F. and held under sterile conditions for about 20 minutes. During this period the viscosity increases, the concentrate forms a gel and the viscosity passes through its maximum point. The gel is immediately broken by passing the gelled product through a Manton-Gaulin type homogenizer using homogenizing pressures of about 3500-4000 p.s.i. The homogenized concentrate is then finally cooled to about 70° F. and canned under asceptic conditions. The resulting product which contains about 10.5 percent milk fat and about 36 percent total milk solids, is free from fat separation and gelation, and can be diluted with water in a ratio of one part concentrate to two parts water to form a milk product having the color and taste of fresh pasteurized whole milk.

The following modified examples which employ the control procedure described above will serve to additionally illustrate the present invention.

General Example 2

Raw whole milk is forewarmed in a continuous heat exchanger at 161° F. for 16 seconds and up, or at about 143° F. to 200° F. for about 30 minutes by the batch method as in General Example 1. As noted in the latter example, optimum conditions can vary depending on the season of the year. The forewarmed milk is then sterilized at about 285 to 300° F. for about 1 to 10 seconds. The sterilized milk (cooling is not necessary if the design of the pan is such that milk can be taken into it at around 300° F.) is next concentrated 3 to 1, in accordance with standard practices, in single, double, triple or double with thermo compression evaporators with the temperature of the concentrate leaving the evaporator around 80-125° F. The resulting product can then be standardized to desired fat and total solids as in the above examples. The concentrate is next heated to 185 to 210° F. and held for about 1 to 10 minutes to develop proper viscosity with a centipoise of about 85 to 150. The milk is then sterilized again at 285 to 300° F. for 1 to 10 seconds. Additional holding time as above or in the above examples to aid in body control may be added at this point. The sterilized concentrate is then then cooled to 125 to 175° F. in a flash cooler or deaerator to remove substances volatile under these conditions, and the resulting cooled sterile product homogenized at 125 to 175° F. at 3000 to 8000 p.s.i. The homogenized sterile product is then cooled to about 40 to 80° F. and canned asceptically.

Specific Example 2

Raw whole milk is subjected to a forewarming treatment at about 205° F. for about 16 seconds (or at 165° F. for 30 minutes) and then sterilized at about 285° F. with 3.2 seconds' come-up time and 3.2 seconds' holding time. The resulting sterilized milk is next concentrated under vacuum to about one-third its volume or to about 36.1% total solids. The concentrate is then heated to 200° F. and held at this temperature for about 1 minute when, at 90-110 centipoises, it is again sterilized at 295° F. with a come-up time of 3.2 seconds and a holding time of 1 second. The sterilized concentrate is next cooled to about 125-175° F. in a flash cooler (or deaerator) and then homogenized at about 150° F. at 8000 p.s.i. The homogenized product is finally cooled to about 55° F. and asceptically canned.

The basic principle used in all of the above examples is the same, i.e. the controlled development of body (increasing viscosity with gel formation) in the concentrated milk and then reducing it (decreasing viscosity with gel break up) by mechanical means. In General Example 1 and Example 1, final sterilization takes place prior to the development of viscosity or gel formation instead of after gel formation as in the other examples. To insure a sterile product the latter is generally preferred in commercial operations.

The finished products, for a control check, can be heated in cans as in the control procedure described above and the viscosity measured over a two-hour period to ascertain any change. This is illustrated by lines C and D in FIGURE II. If, on the one hand, there is substantially no change in viscosity (as shown by line C) the finished product is stable and will not gel under normal storage conditions. If, on the other hand, there is an increase in viscosity (as shown by line D), the finished product is not stable and will gel on storage.

As an additional control check, solubility index measurements on the finished products can also be made. If a reading of over 0.1 ml. of precipitate is observed, then the holding treatment has been too long (e.g. has progressed too far into portion 5 on the curve in FIGURE I) and the deleterious physical-chemical changes referred to above have taken place.

The present invention provides a practical solution to the problem of getting a sterile concentrated whole milk product of good color and taste and free from fat separation and gelation from the dairyland regions of low cost, efficient milk production to areas of less efficient, relatively high cost milk production and to the centers of relatively large populations. The sealed canned product is stable, i.e. requires no refrigeration as indicated above, and can be stored like other stable canned products for long periods of time under normal storage conditions. While the concentrate can be made up of whole milk reduced to about 50 percent of its original volume, as in ordinary evaporated milk, the concentrate of the present invention is preferably made up of whole milk reduced to at least one-third of its original volume. The improved method of the present invention is particularly adaptable for making relatively low moisture fluid products of this type, the use of which results in a material over-all saving in transportation costs.

This application is a continuation-in-part of our prior application Serial No. 687,078, filed September 30, 1957, now abandoned.

We claim:

1. The method of preventing fat separation and gelation in a whole milk concentrate subject to fat separation and gelation, which comprises holding the milk concentrate at an elevated temperature of about 185–210° F. until the concentrate gels and the viscosity passes through its maximum point and, prior to the onset of physical-chemical changes evident by decreased solubility, breaking up the resulting gel.

2. The method of preparing a stable concentrated whole milk product which comprises (1) subjecting raw whole milk to an initial preheat treatment of from about 145° F. to about 205° F. for about 30 minutes, (2) subjecting the resulting hot milk to a final preheat treatment of about 275–300° F. for up to about 3 seconds, (3) concentrating the resulting sterile milk under vacuum, (4) subjecting the resulting concentrated milk to an initial post heat treatment of about 170–185° F., (5) subjecting the hot milk to a final post heat treatment of about 275–300° F. for up to about 3 seconds, (6) cooling the resulting sterile concentrated milk to about 190–210° F., (7) holding the milk at this temperature until the concentrate gels and its viscosity passes through its maximum point, (8) breaking up the gel substantially immediately thereafter and prior to the onset of physical-chemical changes evident by decrease in solubility, and (9) then cooling and canning the resulting sterile concentrate under aseptic conditions.

3. The method of preparing a stable concentrated whole milk product of natural color and taste and free from fat separation and gelation, which comprises subjecting raw whole milk to an initial forewarming treatment at a temperature of about 145° F. to about 205° F., sterilizing the forewarmed milk at a temperature of about 275–300° F., concentrating the sterilized milk to at least 50 percent of its volume in a double effect evaporator with the first effect operating at temperatures up to about 150° F. and the second effect operating at temperatures up to about 120° F., sterilizing the concentrated milk at a temperature of about 275–300° F., cooling the sterilized concentrate to about 190–210° F., holding at this temperature until the resulting concentrate gels and its viscosity passes through its maximum point, homogenizing the resulting gel substantially immediately thereafter and prior to the onset of physical-chemical changes evident by decrease in solubility, cooling the resulting gel-free homogenized concentrate to about room temperature and then canning the concentrate under aseptic conditions.

4. The method of preparing a stable concentrated whole milk product which comprises (1) subjecting raw whole milk to an initial preheat treatment of from about 143° F. to about 200° F. for about 30 minutes. (2) subjecting the resulting hot milk to a final preheat treatment of about 285–300° F. for up to about 1–10 seconds, (3) concentrating the resulting sterile milk under vacuum, (4) holding the milk at a temperature of about 185–210° F. until the viscosity of the concentrate increases and passes through its maximum point, (5) sterilizing the concentrate at about 285–300° F., (6) breaking up the sterilized product prior to the onset of physical-chemical changes evident by decrease in solubility, and (7) then cooling and canning the resulting sterile concentrate under aseptic conditions.

5. The method of preparing a stable concentrated whole milk product of natural color and taste and free from fat separation and gelation, which comprises subjecting raw whole milk to an initial forewarming treatment, sterilizing the forewarmed milk, concentrating the sterilized milk under vacuum to at least 50 percent of its volume, holding the concentrate at a temperature of about 185–210° F. until the viscosity of the concentrate increases and passes through its maximum point, sterilizing the concentrate, homogenizing the resulting sterile product prior to the onset of physical-chemical changes evident of decrease in solubility, and canning the homogenized concentrate under aseptic conditions.

6. The method of preventing fat separation and gelation in a whole milk concentrate subject to fat separation and gelation which comprises holding the concentrate at about 185–210° F. until the viscosity of the concentrate increases and passes through its maximum point, sterilizing the resulting product, breaking up the sterile product prior to the onset of physical-chemical changes evident by decrease in solubility, and canning the resulting sterile product under aseptic conditions.

7. The method of preparing a stable concentrated whole milk product which comprises (1) subjecting raw whole milk to an initial preheat treatment of from about 145° F. to about 205° F. for about 30 minutes, (2) concentrating the milk under vacuum, (3) heating the concentrated milk to about 190–210° F., (4) holding the milk at this temperature until the viscosity of the concentrate increases and passes through its maximum point, (5) subjecting the milk to a heat treatment of about 275–300° F. for up to about 3 seconds, (6), cooling the resulting sterile concentrated milk to about 150° F., (7) homogenizing the milk immediately thereafter and prior to the onset of physical-chemical changes evident by decrease in solubility, and (8) then cooling and canning the resulting sterile concentrate under aseptic conditions.

8. The method of preparing a stable concentrated whole milk product which comprises (1) subjecting raw whole milk to an initial preheat treatment of from about 145° F. to about 205° F. for about 30 minutes, (2) subjecting the milk to a heat treatment of about 275–300° F. for about 3 seconds, (3) concentrating the resulting sterile milk under vacuum, (4) heating the concentrated milk to about 190–210° F., (5) holding the milk at this temperature until the viscosity of the concentrate increases and passes through its maximum point, (6) homogenizing the heat treated milk prior to the onset of physical-chemical changes evident by decrease in solubility, and (7) then cooling and canning the resulting sterile concentrate under aseptic conditions.

9. The method of claim 8 where the raw whole milk after the initial preheat treatment is concentrated and the resulting concentrate is then sterilized prior to holding at about 190–210° F. until the viscosity of the concentrate increases and passes through its maximum point.

References Cited in the file of this patent
UNITED STATES PATENTS
2,087,962    Ball                 July 27, 1937